United States Patent [19]

McGuire et al.

[11] 4,282,580
[45] Aug. 4, 1981

[54] POCKET CALCULATOR WITH GRADE AVERAGING FUNCTION

[76] Inventors: Susan McGuire, 8170 La Riviera Dr., Sacramento, Calif. 95825; Michael Cannon, 1440 29th Ave., Oakland, Calif. 94601

[21] Appl. No.: 73,868

[22] Filed: Sep. 10, 1979

[51] Int. Cl.³ ..................... G06F 15/02; G06F 15/20
[52] U.S. Cl. .................................. 364/734; 364/709
[58] Field of Search ............... 364/575, 709, 710, 734, 364/715, 811

[56] References Cited

U.S. PATENT DOCUMENTS

| | | | |
|---|---|---|---|
| 3,470,368 | 9/1969 | Brittan | 364/811 X |
| 4,048,484 | 9/1977 | Brittan | 364/709 X |
| 4,118,783 | 10/1978 | Collins | 364/734 |

*Primary Examiner*—Jerry Smith
*Attorney, Agent, or Firm*—Mark C. Jacobs

[57] ABSTRACT

A hand-held calculator is provided, having a keyboard, visual display, microprocessor, and power source. The microprocessor is provided with a program that enables the user to enter a sequence of letter grades through the keyboard and compute a running average of the sequence. The current result of the average is visually displayed. The program also allows the user to delete entries from the sequence and adjust the average correspondingly, so that errors in the sequence may be corrected. Further, the program enables the user to calculate running averages of subsequences of grades simultaneously with the overall sequence average, so that grade averages for individual students may be computed at the same time that the grand average over all students is being computed. The display may be switched to indicate either the sequence average or subsequence average at the user's command. A mode switch is further provided to allow the user to switch the device to either the normal calculator function or the grade averaging function.

11 Claims, 8 Drawing Figures

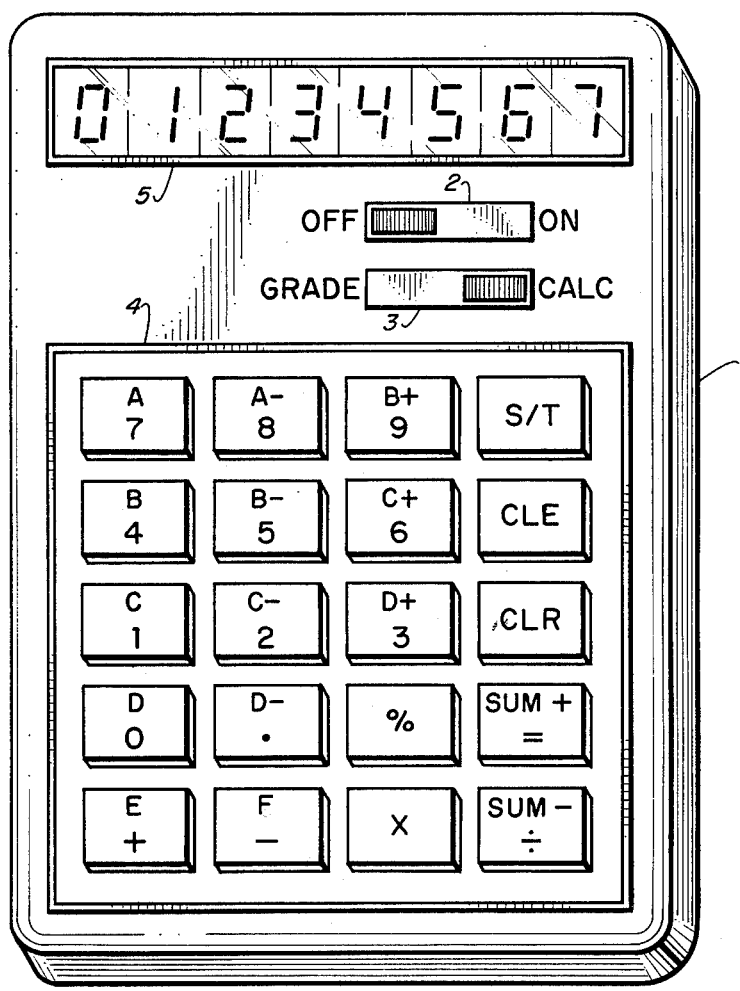
Fig. 1.
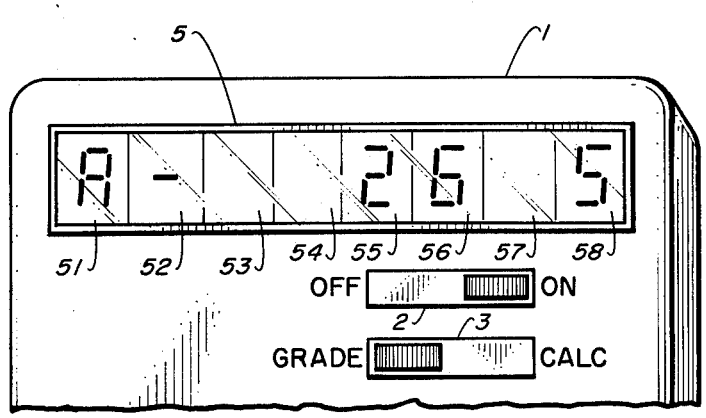
Fig. 8.
Fig. 3.

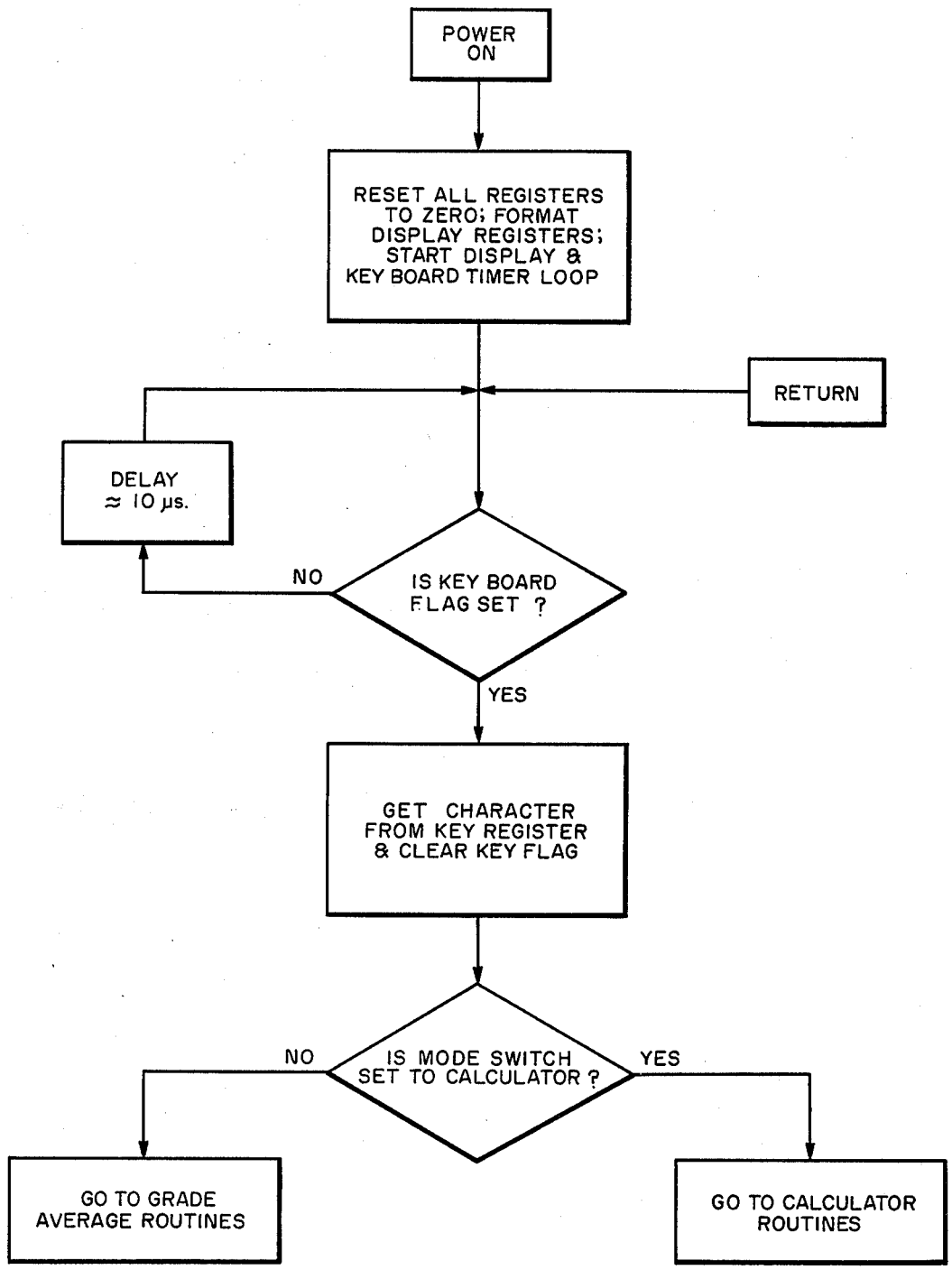
*Fig. 4.* MAIN PROGRAM FLOW CHART

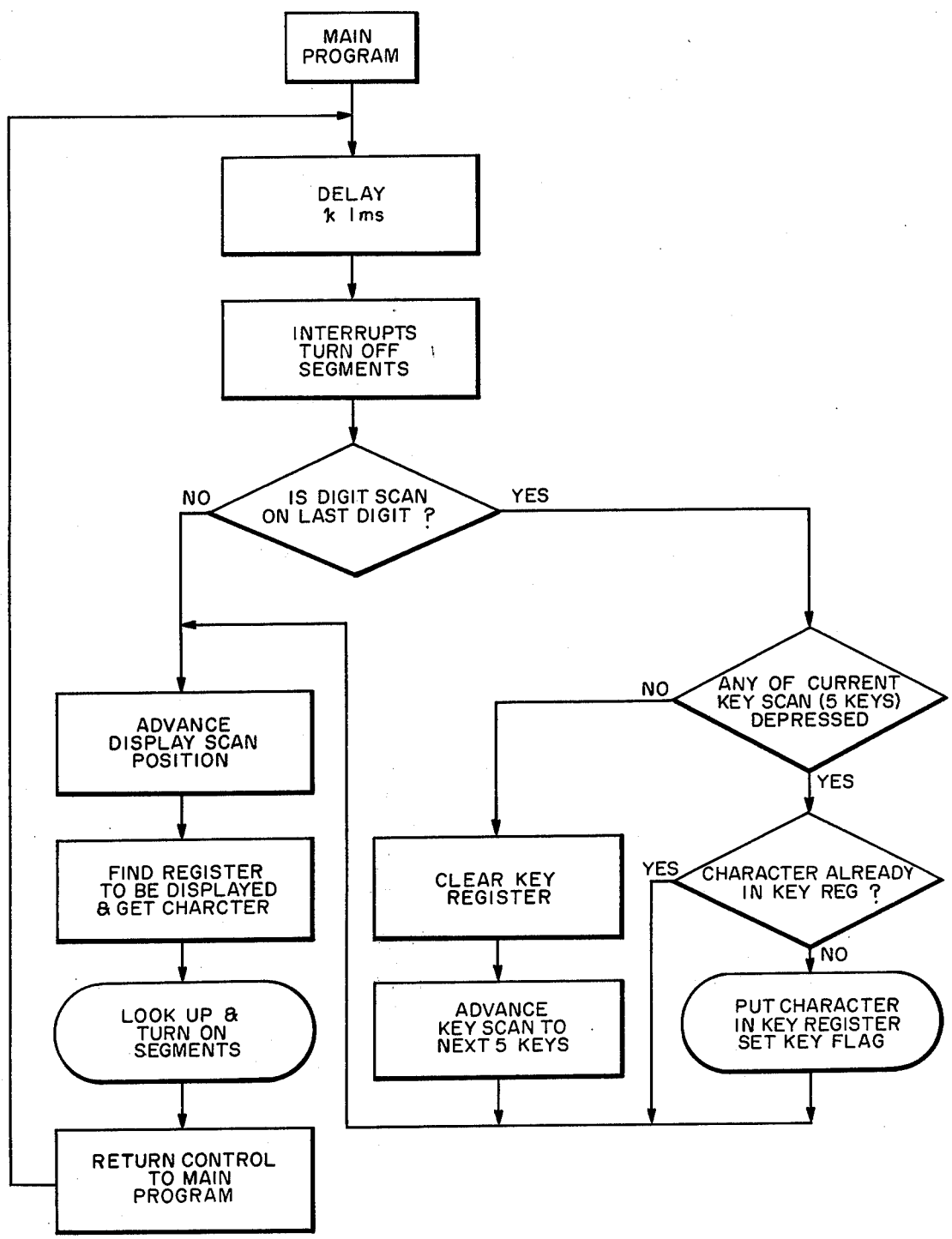
Fig. 5. TIMER LOOP FLOW CHART

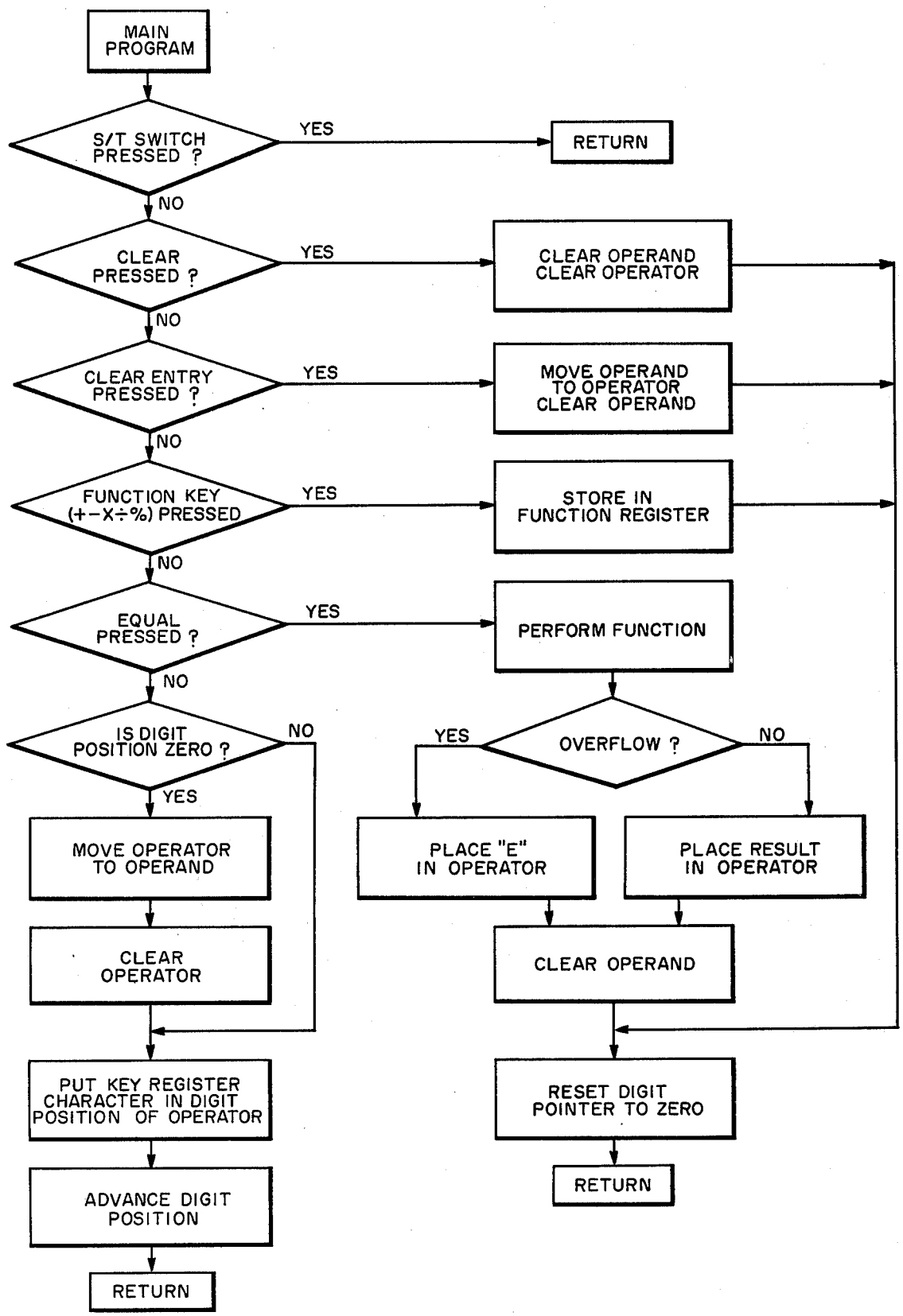
Fig. 6. CALCULATOR PROGRAM FLOW CHART

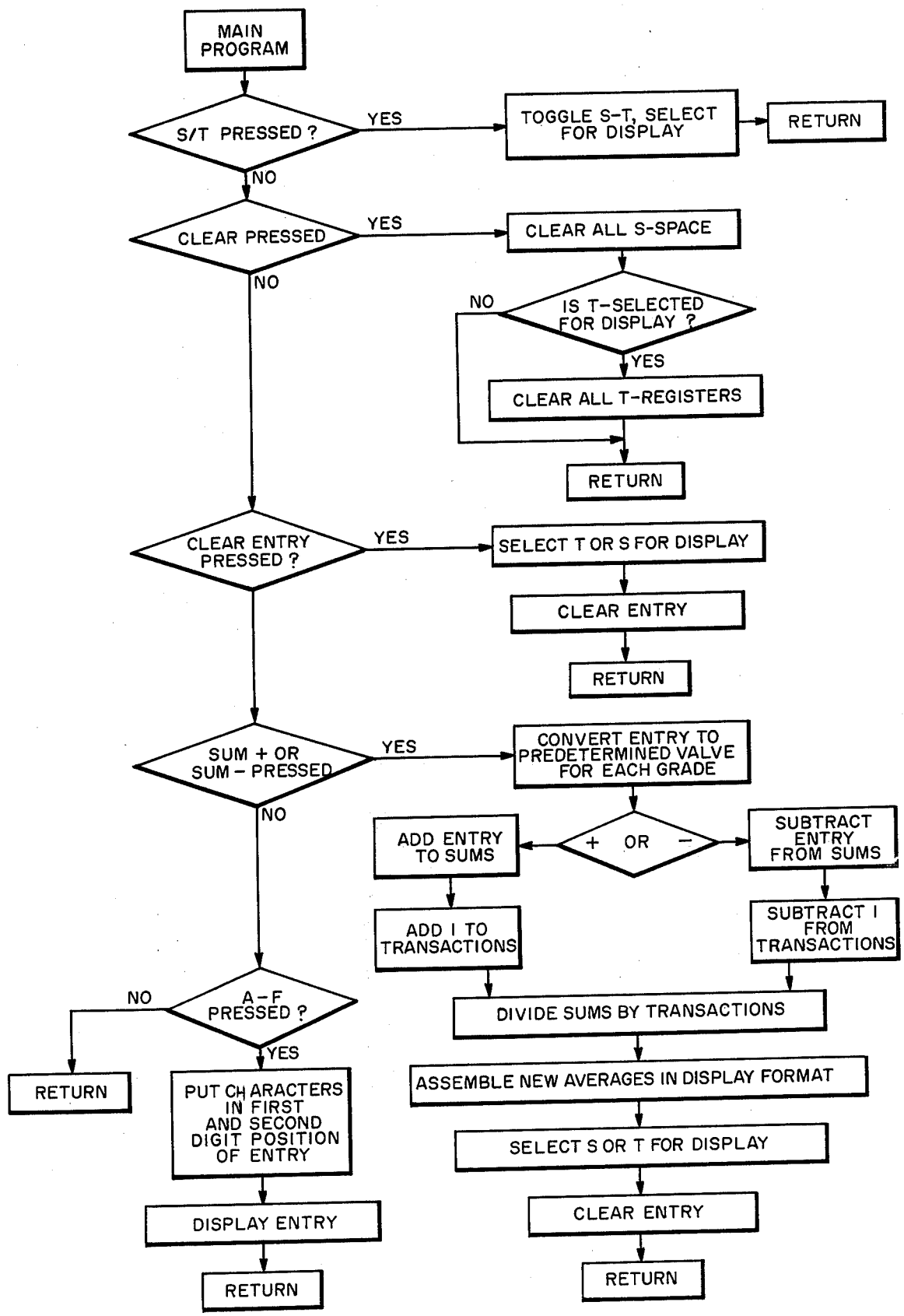
Fig. 7. GRADE AVERAGE PROGRAM FLOW CHART

POCKET CALCULATOR WITH GRADE AVERAGING FUNCTION

BACKGROUND OF THE INVENTION

A. Field of the Invention

This invention pertains generally to the field of hand-held electronic calculators, and more particularly electronic calculators having an alphanumeric input keyboard, visual digital display, and means for executing special functions.

B. Description of the Prior Art

Programmable calculators have been used for a variety of special purposes other than grade averaging, such as cash register operation, automatic weighing and pricing, accounting and billing, gaming, and telephone switching. Calculators designed around a single chip microprocessor have been provided with a keyboard, digital display, and portable power supply in a miniaturized package small enough to be hand-held during operation and conveniently carried in a pocket. Such calculators have been provided with special functions in some instances; however, no previous calculator has a grade averaging function as disclosed herein.

SUMMARY OF THE PRESENT INVENTION

It is an object of the present invention to provide a hand-held electronic calculator having a special function for computing grade averages, for use by teachers and educators.

It is a more specific object of this invention to provide a calculator having a function for computing simultaneously the grade average for individual students in a group and the overall grade average for the group.

It is a further object to provide a hand-held electronic calculator having a mode select switch to allow the calculator to be operated either in the ordinary calculator mode or in the grade averaging mode.

Accordingly, the present invention provides a small rectangular case which may be held in one hand, having a keyboard with 20 keys specially labeled as described herein, an eight-character alphanumeric visual display panel, a power on/off switch, and a calculator/grade averaging mode select switch. Power is supplied to the device by a 9-volt internal battery, and optionally by a plug-in AC adapter cord. Programming can be predetermined, or modular as desired.

BRIEF DESCRIPTION OF THE DRAWINGS

FIG. 1 is a pictorial sketch of a hand-held calculator embodying this invention, showing the keyboard pad, visual display, and power and function switches.

FIG. 3 illustrates the representation of alphanumeric characters 0-9, A-F, + and − in a seven segment display scheme.

FIG. 4 is a flow chart of the main program stored in the microprocessor.

FIG. 5 is a flow chart of the timer loop program stored in the microprocessor.

FIG. 6 is a flow chart of the calculator program stored in the microprocessor.

FIG. 7 is a flow chart of the grade average program stored in the microprocessor.

FIG. 8 is a fragmented top plan view of the calculator of FIG. 1 showing readout indicia in the grade mode.

DESCRIPTION OF THE PREFERRED EMBODIMENT

Figure 2:
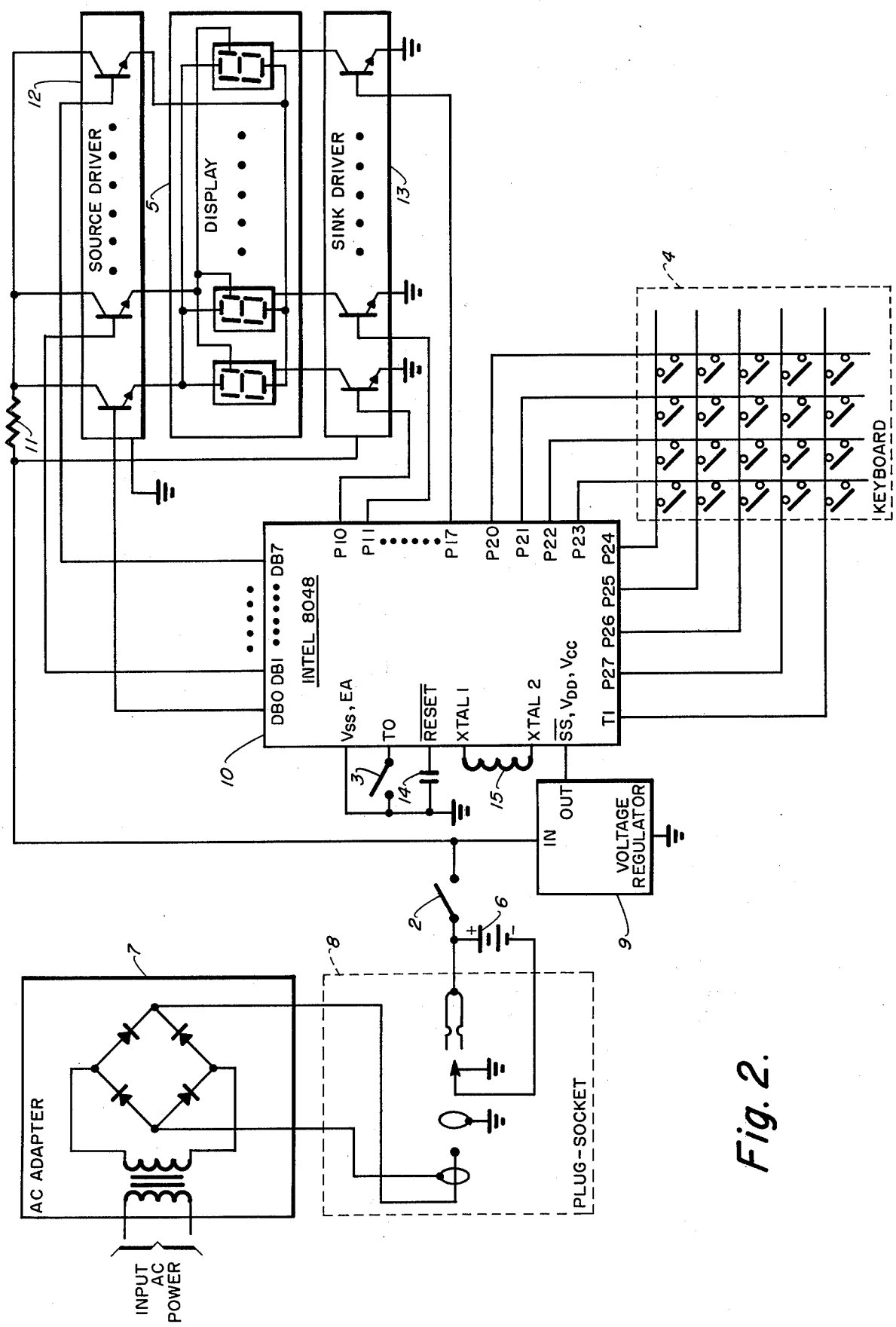
FIG. 2 is a circuit diagram showing the connection between the electrical components of the calculator.

This invention is a pocket-size calculator containing electronic means for carrying out a sequence of instructions and logical operations. In the preferred embodiment these means are incorporated in a microprocessor designated as the Intel Model 8048, which comprises the electronic heart of the calculator. This microprocessor is conventional in the art, and is described in detail in the publication entitled "MCS-48 TM Microcomputer User's Manual", published by Intel Corporation in 1978.

Referring now to the drawings, FIG. 1 shows a pictorial sketch of the calculator viewed from the top. The electronic components are housed in an oblong case 1, which is sufficiently small to enable the user to hold it conveniently in one hand, or carry it in a pocket. The calculator is provided with a main power switch 2, and a mode switch 3 for selecting either the grade averaging function or the normal calculator function as the operating mode. The top face of the calculator has a 20-key keyboard pad 4, and a visual display 5 with eight alphanumeric character elements, which may be incandescent lamps, light-emitting diodes, or any other conventional type of display technology. These display elements have eight segments apiece, constituting seven segments plus a decimal point element. Not shown in FIG. 1 are the socket and adapter plug for optionally supplying power to the calculator from a 110-volt alternating-current source. Some of the keys are seen to be labeled with two different symbols, which is necessary to fit all keyboard operations into 20 keys. No confusion arises from this because these keys represent only the lower symbols when the calculator mode is in operation, and only the upper symbols during the grade averaging mode.

FIG. 2 shows an electrical circuit diagram of the calculator components. Power is ordinarily supplied by a small battery 6 contained inside the calculator case 1. Typically, this battery may generate 9 volts. Also shown in FIG. 2 are an AC adapter 7 for converting 110-volt AC power to 9 volts DC, and a plug and socket 8 for connecting this adapter to the calculator as an alternate source of power. When the adapter is plugged in, the battery is automatically disconnected as shown in the diagram.

Still referring to FIG. 2, the power source is connected to one side of the power switch 2, and the other side of this switch is connected to the input terminal of the voltage regulator 9. The output terminal of this regulator supplies 5 volts of regulated DC power to the microprocessor 10, and is connected to the $\overline{SS}$, $V_{DD}$ and $V_{CC}$ pins of this microprocessor. The power switch 2 is also connected to one terminal of a current-limiting resistor 11, and the other terminal of this resistor is connected to the collector terminals of the source driver 12. This source driver contains eight transistors, each of which drives one segment of each of the display elements. Thus, the eight emitter terminals of the driver are each connected to one of the eight segment terminals of the display 5. The eight character element terminals of this display are each connected to one of the collector terminals of the sink driver 13. The emitter terminals of the sink driver 13 are grounded, and this driver is also connected at its resistor bias terminal to the power switch 2. The substrate terminal of the source driver 12 is grounded.

The eight Port 1 terminals P10-P17 of the microprocessor 10 are each connected to one of the base terminals of the sink driver 13; the voltages of these terminals thus determine which character element of the display is active at any time. The eight Bus terminals DB0-DB7 are each connected to one of the base terminals of the source driver 12; the voltages at these terminals thus control which segment of this display is lit at any time. The eight Port 2 terminals P20-P27 and the input test pin T1 are each connected to one of the nine terminals of the 20-key keyboard pad 4, with P20-P23 connected to the four column terminals and P24-P27, T1 connected to the row terminals. Input information from the keyboard is transmitted to the microprocessor by the voltages at these terminals; when a key is pressed, the corresponding row and column terminals are electrically connected. The $V_{SS}$ and EA terminals of the microprocessor are grounded. The input test pin T0 is connected to one terminal of the mode switch 3, and the other terminal of the switch is grounded. The RESET terminal is connected to a capacitor 14, the other side of which is grounded. The crystal input terminals, XTAL1 and XTAL2, are connected to the terminals of an inductor 15, which provides a timing clock for the microprocessor operation.

The display is operated under control of the microprocessor by means of the multiplexing technique. In this technique the activating voltages are applied sequentially to the eight elements one at a time at a very rapid repetition rate, so that each character is lit for approximately 1 millisecond. The repetition frequency is so great that, to the human eye, all eight elements appear to be lit simultaneously.

FIG. 3 shows a method of representing the alphanumeric characters and "+", "−" and ". ", in a seven-segment plus decimal point scheme. The letters B and D appear in lower case form, and the plus sign is altered slightly. This scheme is only one of several possible methods of representing these characters in an eight segment format.

The 8048 microprocessor controls the calculator by means of a program which is stored in its read-only memory (ROM). For data storage, the microprocessor also has a random access memory (RAM) of 64 eight-bit words, of which the first eight words are special registers used in the execution of the microprocessor instructions. The program is divided into several sections corresponding to the various operating modes of the calculator. The main program receives and processes the input information from the keyboard, and computes the output information to be displayed. A second program, called the timer loop, interrupts the main program at periodic intervals of approximately 1 millisecond, and performs the input and output servicing functions, namely scanning the keyboard and transferring the information to RAM, and multiplex operation of the display as described above.

FIG. 4 shows a flow chart of the main program. When the power is turned on at the switch 2, the program resets all of the registers to zero and then writes a single character zero in one of the registers used for display information. It then starts the timer loop running. Next it tests a flag, designated the key flag, to determine whether information has been written into the register used for keyboard information, designated the key register. If the key flag has not been set, the microprocessor waits for a short period of time, typically 10 microseconds, and then returns to the keyboard test point in the program and tests the key flag again. If the keyboard flag has been set, the program fetches the information from the key register and sends it to the accumulator, and then clears the key flag. Next the voltage at the terminal T0, controlled by the mode switch 3, is tested to determine whether the system is being operated in the calculator or grade averaging mode. The result of this test causes the program to branch to either the calculator subroutine or the grade average subroutine, described below. Both of these subroutines terminate in a return to the keyboard test point.

FIG. 5 is a flow chart of the timer loop. The first step in this program is a delay of approximately 1 millisecond, during which control of the system is exercised by the main program. At the end of this delay period an interrupt request is generated which transfers control of the system to the timer loop. In the 8048 microprocessor this may be done conveniently by means of the timer-interrupt feature of this device. Following the interrupt, the program turns off the display segments. It then tests the display elements to see whether the character currently being displayed is the last digit in a scan, i.e. whether the sequential lighting process for the eight display elements is at the end of a pass through these elements. If not, the program advances the character display to the next element in the sequence, fetches the digital information from the register corresponding to that element, and turns on the display segments which form the character represented by this digital information. The timer loop then returns control of the system to the main program at the location where the interrupt occurred, and begins another 1 millisecond delay period.

If the display element test determines that the display is on the last digit of a scan, the timer loop executes a keyboard scan over one set of five of the twenty keys. The program tests whether any of these five keys are depressed. If not, the key register is cleared, and the keyboard scan is advanced so that the next set of five keys will be tested when the keyboard scan is next carried out. If the preceding test determines that one of the current five keys is depressed, the program then tests whether information is currently in the key register. If so, then the depressed key is left from the previous keyboard scan over these keys, and no action is taken. If the key register is empty, then the digital information corresponding to the depressed key is put into the key register, and the key flag is set. At the end of the keyboard scan, the timer loop returns to the operation of advancing the character display to the next element, beginning a new pass through the display. Thus, the timer loop scans one set of five keys at the end of each scan through the display elements, and the 20 keys are accordingly scanned sequentially, five at a time.

FIG. 6 is a flow chart for the calculator subroutine. In addition to the key register, this program utilizes designated spaces in RAM for the function register (1 character), operand (8 characters) and operator (8 characters). Three bits of RAM are also used as a digit pointer, whose contents determine which display element will show the next alphanumeric character entered on the keyboard. The eight locations for characters in the operator are the registers accessed by the timer loop during display operation; that is, the contents of the operator are displayed continuously.

Referring to FIG. 6, upon entry from the main program, the calculator program performs initially a series of tests. First, the program tests whether the S/T key is depressed. If so, control is returned to the main program because this key is used only in the grade averaging mode. If not, the program tests whether the CLR key is depressed. If so, the operand and operator are cleared, the digit pointer is reset to zero (indicating that the next key pressed will be displayed as the beginning of a new number), and control returns to the main program. If CLR is not pressed, the program tests whether the CLE key is depressed. If so, the digital information in the operand is stored in the operator, the operand is cleared, and the digit pointer is reset to zero and control returns to the main program, thereby erasing the current display and displaying instead the previous information in the operator. If the CLE key has not been pressed, the program tests whether one of the five function keys is depressed. If so, information denoting that function is stored in the function register, the digit pointer is reset, and control returns to the main program. If not, the program tests the equal sign key.

If this key has been depressed, the program performs the function stored in the function register upon the numbers stored in the operator and the operand. The program tests the result of this calculation to determine whether it exceeds the largest number possible for display, corresponding to an overflow. If so, the letter "E" is stored in the operator to designate an error. If not, then the result of the calculation is stored in the operator. In either event, the operand is cleared, the digit pointer is reset, and control is returned to the main program.

If the equal sign key has not been depressed, then a digit is being entered into the display. The program tests the digit pointer to determine whether this digit is the beginning of a new number. If the pointer is set at zero, the operator contents are stored in the operand and the operator is cleared, thereby preserving the prior entry and preparing for entry of the new number. If the digit pointer is not zero, these last two steps are skipped. The program stores the contents of the key register in the operator at the digit position designated by the digit pointer. The digit pointer is then advanced to the next position and control returns to the main program.

The grade average subroutine is illustrated by the flow chart shown in FIG. 7. Besides the key register, this program requires designated RAM space for the T-sum (6 characters), T-transactions (4 characters), T-display (8 characters), S-sum (6 characters), S-transactions (4 characters), S-display (8 characters), and entry (8 characters). This program operates by assigning digital values from one to thirteen for the thirteen possible letter grades from F to A. When a grade is entered into the calculator, its numerical value is added to the sum of the previously entered grades and stored in the sum space. The number of grades entered is counted and stored in the transactions space. The quotient of the sum value divided by the transactions value is stored in the display space, and is accessible to the display. These three memory spaces occur in two different groups: the T-spaces are used to average all grades for all students, and the S-spaces are used for subtotals, viz. averages of all grades for individual students. The total and subtotal averages are thus computed simultaneously. The S/T key toggles the eight display registers accessed by the timer loop between T-display and S-display. Besides these two spaces, the entry space may be displayed when an individual grade is entered.

Referring to FIG. 7, entry into the subroutine from the main program is followed by a test of the S/T key. If this key is depressed, the registers accessed by the timer loop for display are changed from T-display to S-display, or from S-display to T-display, and control is returned to the main program. If not, the program tests the CLR key. If it is depressed, all three S-spaces are cleared, and the T-display is tested to determine whether it contains the current display registers. If so, T-spaces are cleared also. In either case control is returned to the main program.

If the CLR key is not depressed, the program tests the CLE key. If it is depressed, T-display or S-display will be designated for display, depending on the current toggle status of the system, the entry will be cleared, and control will return to the main program. If not, the program will test the SUM+ and SUM− keys to determine whether either is depressed. If so the contents of entry are converted to digital form in weighted values of the values pre-determined to represent the particular letter grades in the programming. For instance, the graded averages in a large Eastern city are A, 90–100, B, 80–89, C, 75–79, D, 70–74, E, 69–60, F 59 or below. Each letter can be subdivided further as may be desired according to plus, straight letter and minus letter [e.g. B+, B, B−] with smaller numerical ranges assigned to each of these. Other school systems, such as those in the state of California, use the +, straight letter, − concept but do not use the E grade. It is seen, therefore, that the programming can be pre-determined such that the device is operative according to the grade system for which it has been pre-programmed, or the programming can be modular, such as is now found in many calculators available in the marketplace from Texas Instruments or Hemlett Packard among others. Here any desired combination of letter alone or in combination with a plus or minus, with any desired assigned point values for each letter can be programmed in at the time of teacher utilization according to the grading structure of that school system merely by the insertion of a module.

While not specifically shown in the drawings, at this stage of development of the calculator art, it would be within the skill of the art to modify the hardware of this invention to provide for modular programming.

After the conversion to digital form, the values are either added to or substrated from T-sum and S-sum, depending on whether SUM+ or SUM− is pressed. The contents of T-transactions and S-transactions are also increased or decreased by 1 respectively. The program then divides the contents of T-sum by that of T-transactions and stores the quotient in T-display. Similarly, the information in S-sum is divided by the value of S-transactions, and the result is stored in S-display. Next, the program selects T-display or S-display for display access by the timer loop, clears entry, and returns to the main program.

If neither the SUM+ nor SUM− key is pressed, the program tests whether any of the thirteen (13) keys A to F (FIG. 8) are depressed. If so, the corresponding information is transferred from the key register to the first and second character location of entry 51 and 52, per FIG. 8, the information in entry is selected for display, and control returns to the main program.

It will be noted that this program does not utilize all of the available space in T-display, S-display and entry. In fact, these memory locations are organized such that the first two character locations contain a letter grade.

In entry this is the letter grade last entered, while in T-display and S-display this letter grade represents the currently computed average. Thus, in storing the quotient of the sums contents divided by the transactions contents, this quotient is decoded back to letter grade form by first rounding to a digit between 1 and 13. Spaces 3, 4, 5 and 6 of the T-display and S-display are used to store the contents of T-transactions and S-transactions, respectively, when the quotient is stored. Finally, the last character element of the display is always used to denote whether the display is toggled into the T-mode or S-mode. The S-mode may be designated by the character 5 in this element, while the T-mode designator is arbitrary (since there is no character similar in appearance to T in the scheme shown in FIG. 3), and may be denoted by a blank space.

Reference is now made to FIG. 8 as to the use of the calculator in grade mode. Note the location of the slide switch 3 as it differs from the location in FIG. 1 wherein the device is in calculator mode.

It is seen that numerical values correlate to specific letter grades range from 1-13. This provides for 13 combinations, e.g A,A−;B+, B,B−;C+,C,C−;D+,D,D−;E, and F.

Thus, character location 51 is utilized by the keying of the letter from A through F. Location 2, designator 52 is employed for the grades which are either plus or minus. If the grade is a straight letter grade, no entry is made at position 52. Position 52 is automatically keyed in by the key being depressed for the entry for position 51.

Positions 53, 54, 55 and 56 are employed for the counting of the number of transactions, i.e. the number of papers or grades being considered toward the final average. Thus, in the example of the FIG. 8, the student has 26 transactions being considered at this point in time. The indicator number is a good check feature for the teacher to verify that each student assuming they have been subjected to all tests etc. has had this total number considered, and none were inadvertently overlooked.

Position 57 is left blank i.e. inoperative as a separator. If desired it is within the scope of the invention to provide position 57 with a dot or other indicia to indicate that the device has the power switch 2 turned on.

Position 58 reads either S or T for the particular register being read out, the subtotal or total.

When a grade is to be entered in memory, it is keyed in and displayed in the particular register shown. As each additional entry is made, the value is added to both memories at the same time. At the same time, the transaction number is displayed, either as the transaction for the particular student or as part of the running total for all students.

For example, if there are 20 students in the class and each has 30 tests or papers for consideration of the grade average, the first ten entries in the subtotal register are for the student, when read out the grade average in total and subtotal will be the same as if only 1 student was considered.

When entries 41, 42, 43, etc are entered, these grades will go into subtotal as entries 1, 2 and 3 for student 2, but into total memory register as entries 41, 42 and 43 in positions 54, 55 and 56. Two different averages are kept at the same time but only 1 is displayed at any time.

When subtotal register is toggled the record for that student is shown, while in total register the class average of those students whose grades have been entered will be displayed. Both register displays show a running average for all of the entries entered to date, by the keying of the SUM+ key as each entry is made.

The SUM− key is used to withdraw an entry made by SUM+ from both memory registers. This is the key used to correct incorrect entries, by returning to status quo such that the correct entry may be keyed in.

As to the total and subtotal keys and their operation, the switch that operates them rocks back and forth on each single depression from mode to mode. After a plurality of entries are made for student #4 keying subtotal gives the grade average for that fourth student for his or her 30 entries or transactions. When the key is attached again, the running average for students 1, 2, 3 and 4 is displayed, and the transaction readout, positions 54, 55 and 56 will display 120.

When a subtotal is displayed, keying "clear" cleanses the subtotal register but keeps total memory. But keying "clear" when a total display is shown clears both registers.

Turning again to the display of FIG. 8, which is in subtotal register for a particular student. The 26th entry has been made and it is an A−. The next keystroke will be SUM+ to bring the entry into the memory registers.

It should be understood that in the disclosure above, the terminology and CLE means clear entry; CLR means clear total and S/T stands for subtotal and total. In this last mentioned key, the key acts as a toggle switch in that the mode is switched back and forth upon every succeeding depression of that key. While not shown in the figures, it is within the skill of the art to add two LED or other indicia means to signal the specific mode of that key at particular time. Obviously, memory features for use with this device when in calculator mode can also be included.

Although the present invention has been described here in one specific embodiment, it is by no means limited to this embodiment, but encompasses a wide range of alternative embodiments. The scheme for scanning the keyboard and display, the type of microprocessor, the program embedded in the microprocessor memory, and other parts of the device, all admit various modifications which fall within the scope of this invention.

It is also seen that a weighted system of grading can be employed with this device within the scope of this invention.

While the specific embodiment as shown in FIG. 1 utilizes a 13 step grading system, other systems with more or less grading increments can be employed with the logic of this invention to achieve student and class grade averages.

What is claimed is:
1. An electronic calculator comprising:
   a. a microprocessor for processing digital input information and generating digital output information, and for controlling the operation of the calculator,
   b. a keyboard having a plurality of grade keys, one key for each letter grade, all connected to said microprocessor,
   c. visual display means connected to said microprocessor for reading digital output information generated by said microprocessor, and
   d. a power supply for furnishing electrical power to operate said microprocessor, input means and visual display means,
   said microprocessor including registers for performing two separate totals of results, such that when a particular grade key is manually stroked, the particular grade of that key is both displayed on the visual display, and entered into each register for accumulation in each total result; and switch means connected to said visual display means for switching back and forth between the two results to be displayed on the display at any point in time.

2. An electronic calculator as recited in claim 1, further comprising a case for housing said microprocessor, input means, visual display means and power supply, said case being sufficiently small to be held in one hand.

3. An electronic calculator as recited in claim 1, wherein said power supply further comprises a battery, a plug socket, and switching means for disconnecting said battery upon plug insertion, thereby providing means for attaching AC adapter means to said calculator as an alternate source of power.

4. An electronic calculator as recited in claim 1, wherein further said microprocessor contains a read only memory, and wherein a program is stored in said read only memory.

5. The device of claim 1 wherein the switch means switches the display for an accumulation subtotal to a running total of all key stroke entries.

6. The device of claim 1 further including a switching means for causing said microprocessor to operate as a mathematical four function calculator or as a grade averaging calculator.

7. An electronic calculator as recited in claim 6, said input means comprising a keyboard having one or more keys with two labels, one label on each such key designating a character or operation which is utilized only with the grade averaging instructions and the other label designating a character or operation which is utilized only with the arithmetic instructions, thereby reducing the number of necessary keys in the keyboard.

8. An electronic calculator as in claim 1 wherein said microprocessor includes means for computing average values of subsequencies of a grade sequence, and means for recording said subsequence average values, and said sequence for display, and wherein said switch means permits the visual display to display either said subsequence average value or said sequence average value.

9. An electronic calculator as in claim 8 further including means for deleting a member of said grade sequence, and means for computing the average value of said grade sequence without the deleted member, and recording said computed average grade value for display by the visual display.

10. The device of claim 1 including:
a. means for forming an average
b. means for keeping an average total of the average,
c. means for upgrading the average.

11. The device of claim 1 wherein one of said separate totals is that of one student, and the other of said grade average calculations is that of an entire class.

* * * * *